(12) United States Patent
Yang et al.

(10) Patent No.: US 8,779,319 B2
(45) Date of Patent: Jul. 15, 2014

(54) TERMINALS FOR VACUUM CIRCUIT BREAKER AND VACUUM CIRCUIT BREAKER HAVING THE SAME

(75) Inventors: Seung Pil Yang, Cheongju-si (KR); Hyun Jae Kim, Cheongju-si (KR)

(73) Assignee: LSIS Co., Ltd., Anyang, Gyeonggi-Do (KR)

( * ) Notice: Subject to any disclaimer, the term of this patent is extended or adjusted under 35 U.S.C. 154(b) by 302 days.

(21) Appl. No.: 13/350,704

(22) Filed: Jan. 13, 2012

(65) Prior Publication Data

US 2012/0199556 A1  Aug. 9, 2012

(30) Foreign Application Priority Data

Feb. 9, 2011  (KR) .................. 10-2011-0011659

(51) Int. Cl.
*H01H 33/66* (2006.01)

(52) U.S. Cl.
USPC ............................ 218/154; 218/118; 218/140

(58) Field of Classification Search
CPC ...... H01H 2201/006; H01H 1/32; H01H 1/46
USPC ........... 218/118, 140, 146, 155, 51, 127, 143, 218/154; 361/676; 355/27; 439/185; 200/304
See application file for complete search history.

(56) References Cited

U.S. PATENT DOCUMENTS

| 3,737,836 | A | * | 6/1973 | Henry et al. | ................... | 439/248 |
| 4,064,383 | A | * | 12/1977 | Barkan | .......................... | 218/120 |
| 4,479,042 | A | * | 10/1984 | Basnett | ......................... | 218/123 |
| 5,864,109 | A |   | 1/1999 | Ahn | | |
| 6,002,560 | A | * | 12/1999 | Nguyen et al. | ................... | 361/23 |
| 7,053,327 | B2 | * | 5/2006 | Benke et al. | .................. | 218/154 |
| 7,695,300 | B2 | * | 4/2010 | Leccia et al. | .................. | 439/263 |

FOREIGN PATENT DOCUMENTS

| CN | 1160751 | 8/2004 |
| JP | 45-18744 | 7/1970 |
| JP | 56-166706 | 12/1981 |
| JP | 63-139720 | 9/1988 |
| JP | 07-046724 | 2/1995 |

(Continued)

OTHER PUBLICATIONS

Russian Federation Federal Service for Intellectual Property, Patents and Trademarks Application Serial No. 2012103972/07, Notice of Allowance dated Apr. 29, 2013, 7 pages.

(Continued)

*Primary Examiner* — Truc Nguyen
(74) *Attorney, Agent, or Firm* — Lee, Hong, Degerman, Kang & Waimey

(57) ABSTRACT

Terminals for a vacuum circuit breaker include: a first terminal having a plurality of supporting rings, a plurality of finger contactors, and ring-shaped springs installed to contact an outer circumferential surface of the finger contactors so as to provide an elastic force to the finger contactors toward the center; a second terminal having an outer diameter larger than an inner diameter of the first terminal formed by an inner circumferential surface of the finger contactors of the first terminal, and configured by a bushing-type electric conductor; and an insulation guide member detachably fixed to a leading end of the second terminal such that an electric insulating property of the second terminal increases when the first and second terminals are disconnected from each other, having an electric insulating property, and tapered so as to have a decreased outer diameter as a distance from the second terminal becomes long.

3 Claims, 4 Drawing Sheets

(56) References Cited

FOREIGN PATENT DOCUMENTS

| | | |
|---|---|---|
| JP | 07-298462 | 11/1995 |
| JP | 08-205337 | 8/1996 |
| JP | 2009-081081 | 4/2009 |
| KR | 10-0179762 | 5/1999 |
| KR | 20030080745 | 10/2003 |
| KR | 100890782 | 3/2009 |
| RU | 2195734 | 12/2002 |

OTHER PUBLICATIONS

Japan Patent Office Application Serial No. 2012-024044, Office Action dated Apr. 2, 2013, 3 pages.

The State Intellectual Property Office of the People's Republic of China Application Serial No. 201210031233.9, Office Action dated Jan. 21, 2014, 8 pages.

* cited by examiner

TERMINALS FOR VACUUM CIRCUIT BREAKER AND VACUUM CIRCUIT BREAKER HAVING THE SAME

CROSS-REFERENCE TO RELATED APPLICATION

This application claims the benefit of earlier filing date and right of priority to Korean Patent Application No. 10-2011-011659, filed on Feb. 9, 2011, the contents of which are hereby incorporated by reference in their entirety.

BACKGROUND OF THE INVENTION

1. Field of the Invention

The present disclosure relates to a vacuum circuit breaker, and particularly, to terminals for a vacuum circuit breaker capable of performing an electric insulating performance even if a distance between a first terminal of a breaker body and a second terminal of a cradle is short at a test position, capable of minimizing impacts of terminals due to an elastic load occurring when terminals are connected to each other, and capable of minimizing vertical vibrations of the breaker body and noises occurring when the terminals are connected to each other or are disconnected from each other, and a vacuum circuit breaker having the same.

2. Background of the Invention

Generally, a vacuum circuit breaker is an electric apparatus for protecting an electric power circuit and a load device, by opening or closing the circuit when a high voltage is applied to the circuit, and by breaking the circuit in the occurrence of an abnormal current such as a short circuit current.

The vacuum circuit breaker is being widely used at a power station, a substation, a power distribution station and a power transmission site. The vacuum circuit breaker may be individually used. Alternatively, the vacuum circuit breaker is used in an accommodated state in an electric power distributing and supervising board together with other instruments for supervising electric power.

The vacuum circuit breaker is categorized into a withdrawal type and a fixed type. The present disclosure relates to a withdrawal type vacuum circuit breaker.

The withdrawal type vacuum circuit breaker largely comprises a cradle and a circuit breaker body (abbreviated as breaker body hereinafter).

The cradle is fixedly-installed at the electric power distributing and supervising board, and includes an external terminal portion for connection to an external electric power circuit and an internal terminal portion for connection to a breaker body side terminal (abbreviated as body side terminal hereinafter). The cradle also includes a bottom portion on which the breaker body moves, and a pair of side plate portions having guide rails for guiding mounting and rolling of wheels of the breaker body.

The breaker body includes main circuit units disposed for three poles (in other words three phases) or three, and body side terminals formed of a conductor and electrically connected to the main circuit units, respectively.

The main circuit units include a vacuum interrupter configured by a vacuum container having therein a fixed contact and a movable contact. The vacuum container is formed of a ceramic material, is in a vacuum state, and has an insulating property. The main circuit units are disposed for three poles, and are configured to open or close electric power circuits of the three poles.

Configurations and operations of terminals for the conventional vacuum circuit breaker will be explained with reference to FIG. 1.

FIG. 1 is a longitudinal sectional view showing a configuration of terminals in accordance with the conventional art. Referring to FIG. 1, the terminals for the conventional vacuum circuit breaker include a first terminal 30 and a second terminal 40.

Referring to FIG. 1, reference numeral 50 designates a safety shutter apparatus supported by a cradle 20, installed in front of the second terminal 40, and movable to an opening position for allowing the first terminal 30 to be connected to the second terminal 40 or a closing position for preventing an access of the first terminal 30 to the second terminal 40. The operation of the safety shutter apparatus 50 to the opening position or the closing position interlocks with a moving operation of a breaker body (not shown) to a connection position, a test position and a disconnection position. The connection position indicates a position where the first terminal 30 of the breaker body and the second terminal 40 of the cradle 20 are connected to each other. The test position indicates a position where the first terminal 30 of the breaker body and the second terminal 40 of the cradle 20 are disconnected from each other, but an electric control power source for testing an opening or closing operation is supplied to a controller of the breaker body. Here, the safety shutter apparatus 50 is disposed at a closing position, and the first terminal 30 is close to the safety shutter apparatus 50 as shown in FIG. 1. The disconnection position indicates a position where the first terminal 30 of the breaker body and the second terminal 40 of the cradle 20 are disconnected from each other, and the electric control power source for testing an opening or closing operation is not supplied to the controller of the breaker body. Here, the safety shutter apparatus 50 is disposed at a closing position, and the first terminal 30 is distant from the safety shutter apparatus 50.

Configurations and operations of a driving apparatus of the safety shutter apparatus 50 have been disclosed in Korean Patent Registration No. 10-0451372 registered by the present applicant (Title of the invention: Shutter driving apparatus of cradle for vacuum circuit beaker), and thus detailed explanations thereof will be omitted.

Firstly, the first terminal 30 is installed at the breaker body, and includes a pair of supporting plates 31, a plurality of finger contactors 32, and a plurality of ring springs 33.

The first terminal 30 is also called a tulip terminal, because the plurality of finger contactors 32 disposed in a radial direction have a tulip shape.

The pair of supporting plates 31 are means for supporting the plurality of finger contactors 32, and are configured by ring-shaped iron discs having a predetermined thickness.

The plurality of finger contactors 32 are finger-shaped conductor contactors, and are radially installed on an outer circumferential surface of the supporting plates 31. Each finger contactor 32 has a pair of insertion recess portions for inserting an outer circumferential surface of the supporting plates 31, a pair of contact protrusion portions, and a plurality of spring accommodation recess portions for accommodating a plurality of ring springs 33 therein.

The plurality of ring springs 33 are accommodated in the spring accommodation recess portions of the finger contactors 32, and provide an elastic force to the finger contactors 32 toward the center of a circle formed by the radially installed plurality of finger contactors 32. When an outer circumferential surface of the second terminal 40 of the cradle has been contacted with an inner circumferential surface of the first terminal 30 formed by the contact protrusion portions of the finger contactors 32, an elastic force of the ring springs 33 serves to maintain a contact pressure between the first terminal 30 and the second terminal 40.

As shown in FIG. 1, the first terminal 30 may further include a connection conductor 35, an insertion member 36, a pressing plate 37, a coupling screw 38 and a housing 34.

The connection conductor 35 is a conductor extending to the main circuit units of the breaker body of the vacuum circuit breaker, and electrically connected to the main circuit units. And, the connection conductor 35 may be configured by a pipe-shaped conductor.

The insertion member 36, the pressing plate 37 and the coupling screw 38 are elements for coupling the plurality of finger contactors 32 to the connection conductor 35.

The insertion member 36 has an insertion portion inserted into the connection conductor 35 and connected to the connection conductor 35 by a pin (not shown), and a flange portion outward extending from one end of the insertion portion in a radial direction. The flange portion has a recess portion.

The pressing plate 37 is inserted into the recess portion of the flange portion of the insertion member 36, as the tighten the coupling screw 38 thereby adhering the flange portion of the insertion member 36 to an inner surface (refer to inner surface of left end portion of finger contactor 32 in FIG. 1) of one end of the finger contactors 32 through the pressing plate 37.

The coupling screw 38 is the element for adhering the flange portion of the insertion member 36 to an inner surface of one end of the finger contactors 32 by inserting into the insertion portion of the insertion member 36.

The housing 34 accommodates therein the connection conductor 35, the insertion member 36, the pressing plate 37 and the coupling screw 38, thereby providing a case for accommodating therein part of the finger contactors 32.

Referring to FIG. 1, the second terminal 40 is fixedly-installed at a rear vertical plate 20a of the cradle, and is configured by a bushing-type electric conductor. The second terminal 40 may be fixed to the rear vertical plate 20a without being moved up and down, by supporting plates 41 for supporting upper and lower surfaces of the second terminal 40 on front and rear surfaces of the rear vertical plate 20a, and by connection bolts 42 for fixing the supporting plates 41 to the rear vertical plate 20a.

Referring to FIG. 1, reference numeral 43 designates a screw opening.

An outer diameter of the second terminal 40 is larger than an inner diameter of an inner circumferential surface of the first terminal 30 formed by an inner side surface of each finger contactor 32.

When the second terminal 40 and the first terminal 30 operate to a connection position from a test position, each finger contactor 32 of the first terminal 30 is outward widened in a radial direction within a short time due to collision with the second terminal 40. Here, part of the breaker body having the first terminal 30 is lifted up to fall down, i.e., has vertical vibrations. This may cause vibration noises, and damages of a terminal portion and the breaker body.

Furthermore, as the finger contactors 32 are outward widened in a radial direction during a connection operation, a larger elastic force of the ring spring 33 is required so as to reduce an electric resistance by maintaining a contact force between the finger contactors 32 and an outer circumferential surface of the second terminal 40.

Besides, in order to obtain a predetermined electric insulating distance between the first terminal 30 and the second terminal 40, the second terminal 40 has to be formed to have a short length. This may cause a front surface of a leading end of the second terminal 40 to be almost perpendicular to an outer circumferential surface of the second terminal 40. As a result, the second terminal 40 may collide with the first terminal 30 during an initial operation toward a connection position. This may cause part of the breaker body having the first terminal 30 to be lifted up to fall down (i.e., to vertically vibrate). As a result, noise may occur and the terminal portion and the breaker body may be damaged.

Furthermore, the vertical vibrations and noises also occur when the breaker body is backward moved to a test position from a connection position.

SUMMARY OF THE INVENTION

Therefore, an aspect of this disclosure is to provide terminals for a vacuum circuit breaker, the terminals capable of performing an electric insulating performance between a terminal of a breaker body and a terminal of a cradle at a test position, and capable of minimizing impacts and vibrations occurring when the terminal of the breaker body and the terminal of the cradle are connected to each other or disconnected from each other.

Another aspect of the this disclosure is to provide a vacuum circuit breaker having terminals capable of capable of performing an electric insulating performance between a terminal of a breaker body and a terminal of a cradle at a test position, and capable of minimizing impacts and vibrations occurring when the terminal of the breaker body and the terminal of the cradle are connected to each other or disconnected from each other.

To achieve these and other advantages and in accordance with the purpose of this specification, as embodied and broadly described herein, there is provided terminals for a vacuum circuit breaker, comprising:

a first terminal having a plurality of supporting rings, a plurality of finger contactors radially disposed so as to encompass the supporting rings, and ring-shaped springs installed to contact an outer circumferential surface of the finger contactors so as to provide an elastic force to the finger contactors;

a second terminal having an outer diameter larger than an inner diameter of the first terminal formed by an inner circumferential surface of the finger contactors of the first terminal, and configured by a bushing-type electric conductor; and an insulation guide member detachably fixed to a leading end of the second terminal such that an electric insulating property of the second terminal increases when the first and second terminals are disconnected from each other, having an electric insulating property, and tapered so as to have a decreased outer diameter as a distance from the second terminal becomes long.

To achieve these and other advantages and in accordance with the purpose of this specification, as embodied and broadly described herein, there is also provided a vacuum circuit breaker, comprising:

a cradle having a terminal portion connectable to an electric power source side and an electric load side of an electric power circuit, and having a bottom portion which provides a movable path;

a breaker body having a plurality of main circuit units for opening or closing an electric circuit for three poles, and movable along the movable path of the bottom portion of the cradle to a first position for connection to the terminal portion of the cradle, or a second position separated from the terminal portion of the cradle;

a first terminal installed on the cradle or the breaker body, and having a plurality of supporting rings, a plurality of finger contactors radially disposed to encompass the supporting rings, and ring-shaped springs installed to contact an outer circumferential surface of the finger contactors so as to provide an elastic force to the finger contactors;

a second terminal installed on another of the cradle or the breaker body where the first terminal has not been installed, having an outer diameter larger than an inner diameter of the first terminal formed by an inner circumferential surface of the finger contactors of the first terminal, and configured by a bushing-type electric conductor; and an insulation guide member detachably fixed to a leading end of the second terminal such that an electric insulating property of the second terminal increases when the first and second terminals are disconnected from each other, having an electric insulating property, and tapered so as to have a decreased outer diameter as a distance from the second terminal becomes long.

According to one aspect of the present disclosure, the largest outer diameter of the insulation guide member may not be greater than an outer diameter of the second terminal, and the smallest outer diameter of a free end of the insulation guide member may be equal to or less than an inner diameter of the first terminal.

According to another aspect of the present disclosure, the smallest outer diameter of a free end of the insulation guide member may be equal to or less than an inner diameter of the first terminal.

According to still another aspect of the present disclosure, the largest outer diameter of the insulation guide member may not be greater than an outer diameter of the second terminal, and may be greater than an inner diameter of the first terminal.

According to yet still another aspect of the present disclosure, the vacuum circuit breaker may further include a coupling bolt configured to couple a leading end of the second terminal to the insulation guide member. The second terminal may have a recess portion on a front surface thereof, and the insulation guide member may have a protrusion portion on a rear surface thereof. As the protrusion portion of the insulation guide member is fitted into the recess portion of the second terminal, the insulation guide member and the second terminal may be coupled to each other.

Further scope of applicability of the present application will become more apparent from the this disclosure given hereinafter. However, it should be understood that the this disclosure and specific examples, while indicating preferred embodiments of the invention, are given by way of illustration only, since various changes and modifications within the spirit and scope of the invention will become apparent to those skilled in the art from the this disclosure.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, with reference to FIGS. 2 to 4, will be explained configurations and operation effects of terminals for a vacuum circuit breaker, and a vacuum circuit breaker having the same according to a preferred embodiment of the present disclosure.

Figure 1:
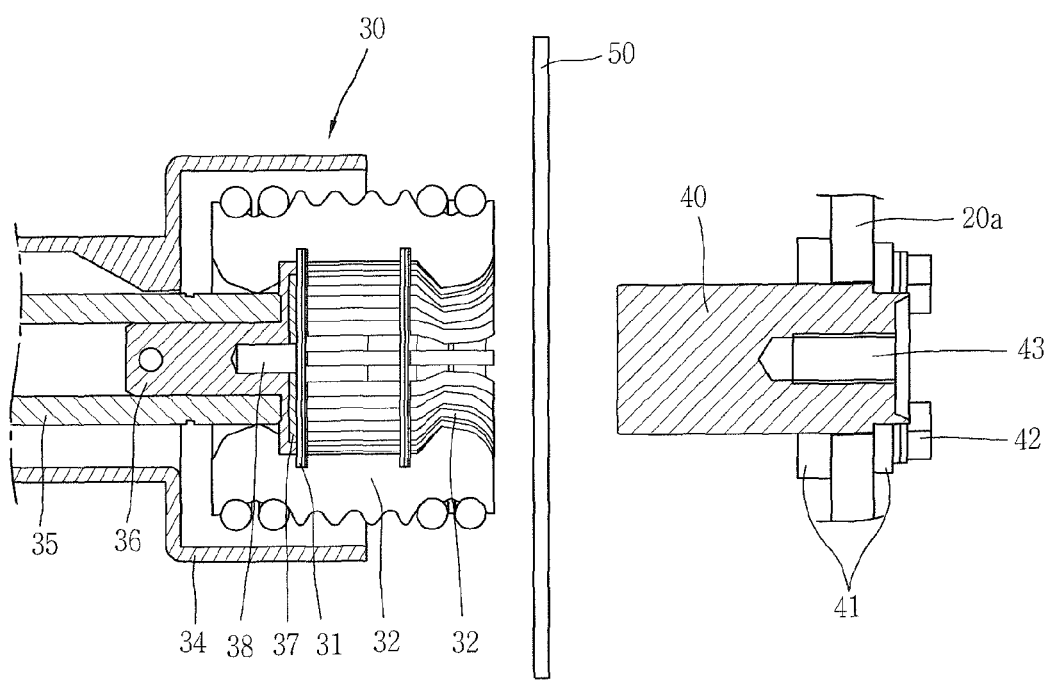
FIG. 1 is a longitudinal sectional view showing a state that a first terminal and a second terminal of a vacuum circuit breaker are disconnected from each other at a test position in accordance with the conventional art.
Figure 2:
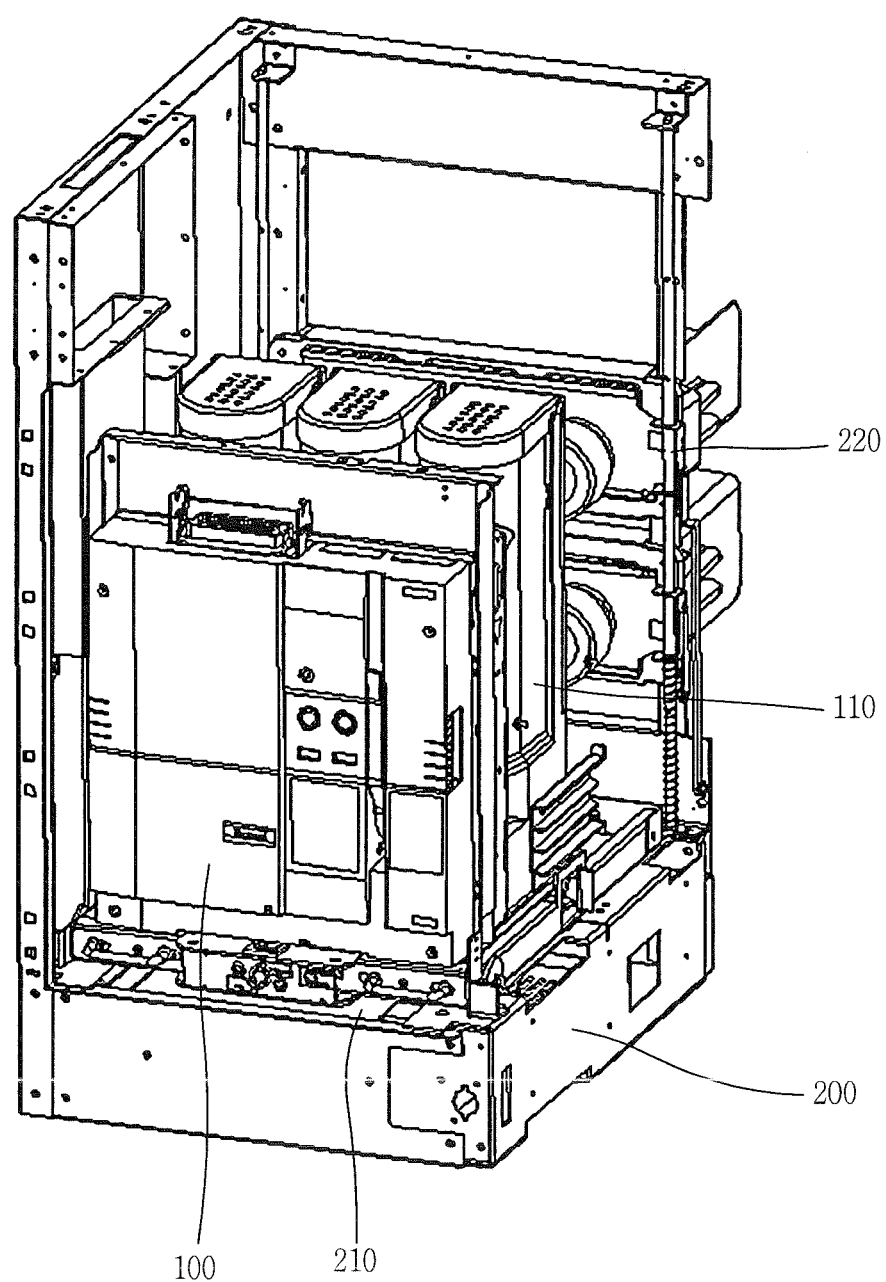
FIG. 2 is a perspective view showing a configuration of a vacuum circuit breaker according to a preferred embodiment of the present disclosure, in which one side plate of a cradle has been removed.

As shown in FIG. 2, the vacuum circuit breaker according to a preferred embodiment of the present disclosure comprises a cradle 200 and a breaker body 100.

The cradle 200 is a terminal portion connectable to wires of an electric power source side and an electric load side of an electric power circuit, and has a second terminal (refer to reference numeral 500 of FIGS. 3 and 4) and a bottom portion 210 which provides a movable path to the breaker body 100.

Referring to FIG. 2, the breaker body 100 has three main circuit units 110 for opening or closing the 3 circuits for three poles. The breaker body 100 is movable, along a movable path of the bottom portion 210, to a first position for connection to a terminal portion of the cradle 200 (i.e., the second terminal 500), or to a second position separated from the terminal portion of the cradle 200 (i.e., the second terminal 500).

Referring to FIG. 2, reference numeral 220 designates a rear vertical plate of the cradle 200, which supports the second terminal 500.

Configurations of the first terminal 300 and the second terminal 500 of the vacuum circuit breaker according to a preferred embodiment of the present disclosure will be explained in more details with reference to FIG. 3.

Figure 3:
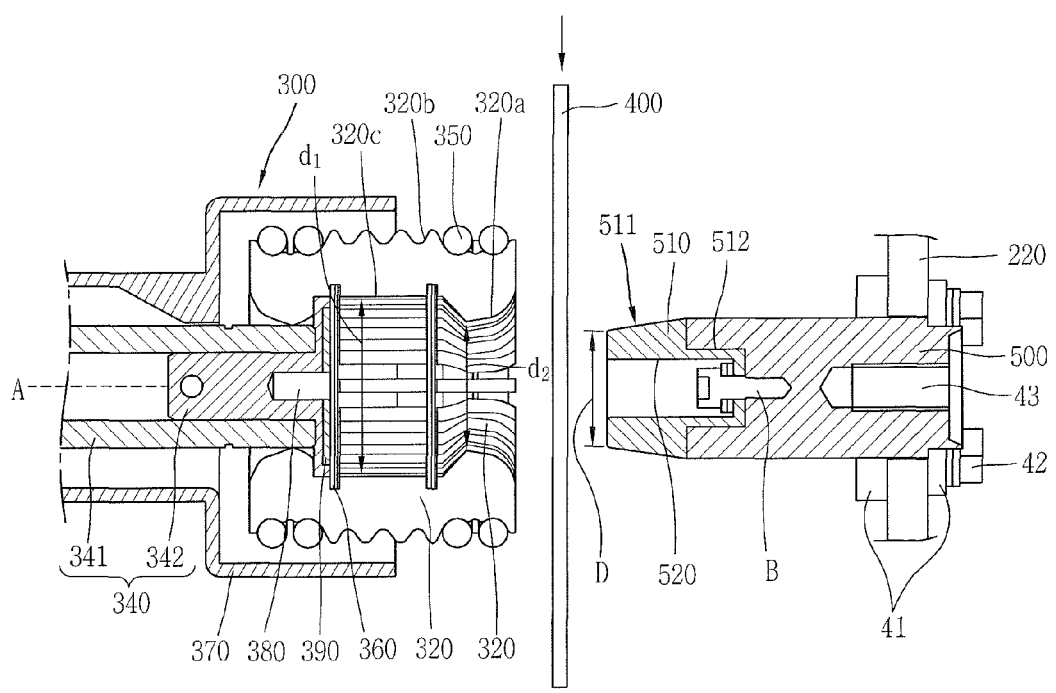
FIG. 3 is a longitudinal sectional view showing a configuration and an operation state of terminals for a vacuum circuit breaker according to a preferred embodiment of the present disclosure, in which a first terminal and a second terminal of a vacuum circuit breaker are disconnected from each other at a test position.

In FIG. 3, the first terminal 300 is installed at the breaker body 100. However, the first terminal 300 may be also installed at the cradle 200, not the breaker body 100. In the case that the first terminal 300 is installed at the cradle 200, the second terminal 500 is installed at the breaker body 100.

The first terminal 300 includes a plurality of supporting rings 360, a plurality of finger contactors 320, and a plurality of ring-shaped springs 350.

The plurality of supporting rings 360 are means for supporting the plurality of finger contactors 320, and may be configured by ring-shaped iron discs having a predetermined thickness.

The plurality of finger contactors 320 are finger-shaped conductor contactors, and are radially installed so as to encompass the supporting rings 360. Each finger contactor 320 has a pair of insertion recess portions for inserting an outer circumferential surface of the supporting rings 360, a pair of contact protrusion portions 320a, and a plurality of spring accommodation recess portions 320b for accommodating a plurality of ring springs 330 therein. The pair of contact protrusion portions 320a are disposed at both ends of the finger contactor 320, and a middle plane portion 320c is disposed between the both of the contact protrusion portions 320a. The pair of contact protrusion portions 320a are the portion of the first terminal 300 which directly contacts an outer circumferential surface of the second terminal 500.

The plurality of ring-shaped springs 350 are installed to contact an outer circumferential surface of the finger contactors 320 so as to provide an elastic force to the finger contactors 320 toward the center of a circle formed by the radially installed finger contactors 320. When an outer circumferential surface of the second terminal 500 has been contacted to an inner circumferential surface of the first terminal 300 formed by the contact protrusion portions 320a of the finger contactors 320, an elastic force of the ring springs 350 serves to maintain a contact pressure between the first terminal 300 and the second terminal 500.

As shown in FIG. 3, the first terminal 300 may further include a connection conductor portion 340 having a connection conductor 341 and an insertion member 342, a pressing plate 390, a coupling screw 380 and a housing 370.

As aforementioned, the connection conductor 341 is a conductor extending to the main circuit units 110 of the breaker body 100 of the vacuum circuit breaker, and electrically connected to the main circuit units 110. And, the connection conductor 341 may be configured by a pipe-shaped conductor.

The insertion member 342, the pressing plate 390 and the coupling screw 380 are elements for coupling the plurality of finger contactors 320 to the connection conductor 341.

The insertion member 342 has an insertion portion inserted into the connection conductor 341 and connected to the connection conductor 341 by a pin (not shown), and a flange portion outward extending from one end of the insertion portion in a radial direction. The flange portion has a recess portion.

The pressing plate 390 is fitted into the recess portion of the flange portion of the insertion member 342, and is adhered to an inner surface (refer to an inner side surface of the leftmost finger contactor in FIG. 3) of one end of the finger contactors 320 by pressing the flange portion of the insertion member 342 as the coupling screw 380 is tightened.

The coupling screw 380 is inserted into the insertion portion of the insertion member 342 by penetrating through the center of the pressing plate 390, thereby adhering the flange portion of the insertion member 342 to an inner surface of one end of the finger contactors 320 through the pressing plate 390.

The housing 370 accommodates therein the connection conductor 341, the insertion member 342, the pressing plate 390 and the coupling screw 380, thereby providing a case for accommodating therein part of the finger contactors 320.

In FIG. 3, the second terminal 500 is installed at the cradle 200, more concretely, the rear vertical plate 220 of the cradle 200. However, the second terminal 500 may be installed at the breaker body 100, not the cradle 200. In the case that the second terminal 500 is installed at the breaker body 100, the first terminal 300 is installed at the cradle 200.

The second terminal 500 has an outer diameter larger than an inner diameter of the first terminal 300 formed by an inner circumferential surface of the finger contactors 320, and is configured by a bushing-type electric conductor.

Figure 4:
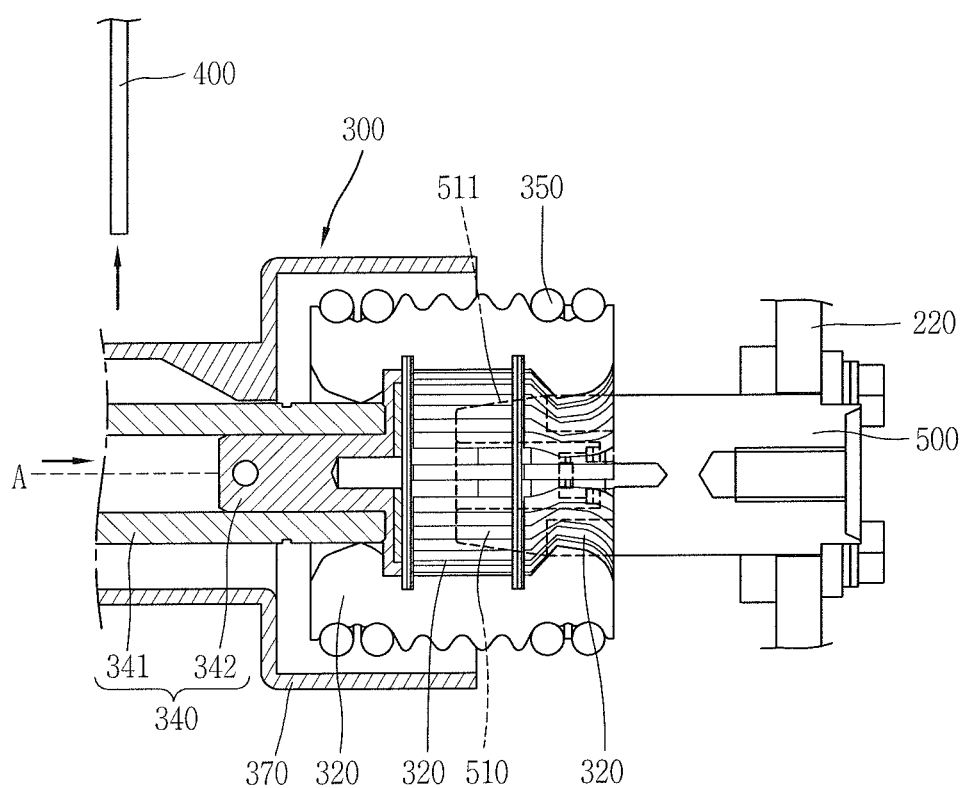
FIG. 4 is a longitudinal sectional view showing a configuration and an operation state of terminals for a vacuum circuit breaker according to a preferred embodiment of the present disclosure, in which a first terminal and a second terminal of a vacuum circuit breaker are connected to each other at a connection position.

As shown in FIGS. 3 and 4, the terminals for a vacuum circuit breaker, or the vacuum circuit breaker having the same according to a preferred embodiment of the present disclosure further comprises an insulation guide member 510.

When the first terminal 300 and the second terminal 500 have been separated from each other, the insulation guide member 510 serves to increase an electric insulating property of the second terminal 500 from the first terminal 300. That is, when the vacuum circuit breaker according to a preferred embodiment of the present disclosure is disposed at a test position, the insulation guide member 510 provides an electric property to the first terminal 300 and the second terminal 500 in a state that the first terminal 300 and the second terminal 500 have been separated from each other but have been adjacent to each other.

The insulation guide member 510 has an electric insulating property, and is detachably fixedly-installed at the leading end of the second terminal 500.

According to a preferred embodiment of the present disclosure, the insulation guide member 510 is tapered so as to have a decreased outer diameter as it becomes distant from the second terminal 500. In FIG. 3, reference numeral 511 designates a tapered outer circumferential surface of the insulation guide member 510.

According to a preferred embodiment of the present disclosure, as the second terminal 500 is formed in a bushing shape having a recess portion on the front surface thereof, the insulation guide member 510 has a corresponding protrusion portion 512 on the rear surface thereof. As the protrusion portion 512 of the insulation guide member 510 is fitted into the recess portion of the second terminal 500, the insulation guide member and the second terminal may be coupled to each other.

Referring to FIG. 3, the smallest outer diameter (D) of a free end of the insulation guide member 510 may be equal to or less than an inner diameter (d2) of the first terminal 300.

Once the first terminal 300 of the breaker body 100 is connected to the second terminal 500 of the cradle 200, a contact impact between the first terminal 300 and the second terminal 500 is minimized. This may prevent vibrations and noises occurring when the first terminal 300 is lifted up to fall down, and may allow a smooth connection between the first terminal 300 and the second terminal 500.

As shown in FIG. 3, the largest outer diameter of the insulation guide member 510 (the rightmost insulation guide member in FIG. 3) may not be greater than an outer diameter of the second terminal 500, and may be greater than an inner diameter (d2) of the first terminal 300.

Under this configuration, the connection between the first terminal 300 and the second terminal 500 is performed, and the insulation guide member 510 and the second terminal 500 are introduced into an inner space of a ring formed by the finger contactors 320. As a result, an inner circumferential surface of the finger contactors 320 of the first terminal 300 is pressed by an outer circumferential surface of the insulation guide member 510 and an outer circumferential surface of the second terminal 500 to be outward widened. Here, an elastic force of the ring-shaped springs 350 is applied to the center of the ring formed by the finger contactors 320, the finger contactors 320 of the first terminal 300 maintain a contacted state to an outer circumferential surface of the second terminal 500.

As can be seen from FIG. 3, the terminals for a vacuum circuit breaker, or the vacuum circuit breaker having the same according to a preferred embodiment of the present disclosure further comprises a coupling bolt (B) configured to couple a leading end of the second terminal 500 to the insulation guide member 510.

The insulation guide member 510 has a recess portion 520 for insertion of the coupling bolt (B).

As the protrusion portion formed on the rear surface of the insulation guide member 510 is inserted into the recess portion formed on the front surface of the second terminal 500, the insulation guide member 510 and the second terminal 500 may be coupled to each other. Here, the coupled state may be maintained more stably, by inserting the coupling bolt (B) into a rear wall of the recess portion of the second terminal 500 by penetrating through the protrusion portion of the insulation guide member 510.

In FIGS. 3 and 4, reference numeral 400 designates a safety shutter apparatus. The safety shutter apparatus has been aforementioned in the background of the invention, and thus its detailed explanations will be omitted.

Referring to FIG. 3, the second terminal 500 may be fixed to the rear vertical plate 220 of the cradle 200 without being moved up and down, by a pair of supporting plates 41 for supporting upper and lower surfaces of the second terminal 500 on front and rear surfaces of the rear vertical plate 220, and by connection bolts 42 for fixing the supporting plates 41 to the rear vertical plate 220.

In FIG. 3, reference numeral 43 designates a screw opening.

With reference to FIG. 3 or FIG. 4, will be explained an operation of the terminals for a vacuum circuit breaker, or the vacuum circuit breaker having the same according to a preferred embodiment of the present disclosure, to a connection position or a disconnection position.

Firstly, an operation of the vacuum circuit breaker according to a preferred embodiment of the present disclosure to a connection position shown in FIG. 4 from a test position shown in FIG. 3 will be explained with reference to FIG. 2.

Referring to FIG. 2, the breaker body 100 is moved toward the rear vertical plate 220 of the cradle 200 by a manual moving means including a manipulating handle for manual manipulations, a spindle rotated by being coupled to the manipulating handle, and a movable carriage movable back and forth in a state of being screw-coupled to a screw surface of the spindle and stacking thereon the breaker body 100. As a result, the safety shutter apparatus 400 aforementioned in the background of the invention is open to allow the introduction of the first terminal 300.

The configuration and operation of the manual moving means have been disclosed in Korean Patent Registration No. 10-0324492 registered by the present applicant, and thus its detailed explanations will be omitted.

Once the breaker body 100 is more moved toward the rear vertical plate 220 of the cradle 200 by the manual moving means, as shown in FIG. 4, the insulation guide member 510 and the second terminal 500 are introduced into an inner space of a ring formed by the finger contactors 320. As a result, an inner circumferential surface of the finger contactors 320 of the first terminal 300 is pressed by an outer circumferential surface of the insulation guide member 510 and an outer circumferential surface of the second terminal 500 to be outward widened. Here, an elastic force of the ring-shaped springs 350 is applied to the center of the ring formed by the finger contactors 320, the finger contactors 320 of the first terminal 300 maintain a contacted state to an outer circumferential surface of the second terminal 500.

According to a preferred embodiment of the present disclosure, the insulation guide member 510 is tapered so as to have a decreased outer diameter as it becomes long from the second terminal 500. The smallest outer diameter (D) of a free end of the insulation guide member 510 is equal to or less than an inner diameter (d2) of the first terminal 300. Under this configuration, when the first terminal 300 is connected to the second terminal 500, a contact impact between the first terminal 300 and the second terminal 500 is minimized. This may prevent vibrations and noises occurring when the first terminal 300 is lifted up to fall down, and may allow a smooth connection between the first terminal 300 and the second terminal 500.

Next, an operation of the vacuum circuit breaker according to a preferred embodiment of the present disclosure to the test position shown in FIG. 3 from the connection position shown in FIG. 4 will be explained with reference to FIG. 2.

Referring to FIG. 2, once the breaker body 100 is moved to be distance from the rear vertical plate 220 of the cradle 200 by the manual moving means, the finger contactors 320 contacting an outer circumferential surface of the insulation guide member 510 and the second terminal 500 backward move as shown in FIG. 3. As a result, the finger contactors 320 are separated from the outer circumferential surface of the insulation guide member 510 and the second terminal 500. This may cause the breaker body 100 to be electrically separated from the electric power source side and the electric load side of the electric power circuit connected to the second terminal 500 of the cradle 200.

According to a preferred embodiment of the present disclosure, the insulation guide member 510 is tapered so as to have a decreased outer diameter as it becomes long from the second terminal 500. The smallest outer diameter (D) of a free end of the insulation guide member 510 is equal to or less than an inner diameter (d2) of the first terminal 300. Under this configuration, when the first terminal 300 is disconnected from the second terminal 500, may be prevented vibrations and noises occurring when the first terminal 300 is lifted up to fall down, and the disconnection may be smoothly performed.

In the terminals for a vacuum circuit breaker, and the vacuum circuit breaker having the same according to the present disclosure, an electric insulating property between the first terminal 300 and the second terminal 500 at a test position may be obtained by the insulation guide member 510 connected to the leading end of the second terminal 500. Furthermore, since an outer circumferential surface 511 of the insulation guide member 510 is tapered so as to have a decreased outer diameter as it becomes distance from the second terminal 500, may be minimized impacts and vibrations occurring when the first terminal 300 is connected to the second terminal 500 or when the first terminal 300 is separated from the second terminal 500.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A vacuum circuit breaker, comprising:
a cradle having a terminal portion connectable to an electric power source side and an electric load side of an electric power circuit, and having a bottom portion which provides a movable path;
a breaker body having a plurality of main circuit units for opening or closing an electric circuit for three poles, and movable along the movable path of the bottom portion of the cradle to a first position for connection to the terminal portion of the cradle, or a second position separated from the terminal portion of the cradle;
a first terminal installed on the cradle or the breaker body, and having a plurality of supporting rings, a plurality of finger contactors radially disposed to encompass the supporting rings, and ring-shaped springs installed to contact an outer circumferential surface of the finger contactors so as to provide an elastic force to the finger contactors;
a second terminal installed on another of the cradle or the breaker body where the first terminal has not been installed, having an outer diameter larger than an inner diameter of the first terminal formed by an inner circumferential surface of the finger contactors of the first terminal, and configured by a bushing-type electric conductor;
an insulation guide member detachably fixed to a leading end of the second terminal such that an electric insulating property of the second terminal increases when the first and second terminals are disconnected from each other, wherein the insulation guide member has an electric insulating property, and is tapered such that an outer diameter of the insulation guide member decreases along a direction leading outward from the leading end of the second terminal; and
a coupling bolt configured to couple the leading end of the second terminal to the insulation guide member,
wherein the second terminal has a recess portion on a front surface thereof,
wherein the insulation guide member has a protrusion portion on a rear surface thereof, and
wherein the insulation guide member and the second terminal are coupled to each other by fitting the protrusion portion of the insulation guide member into the recess portion of the second terminal.

2. The vacuum circuit breaker of claim 1, wherein a smallest outer diameter of a free end of the insulation guide member is equal to or less than the inner diameter of the first terminal.

3. The vacuum circuit breaker of claim 2, wherein a largest outer diameter of the insulation guide member is not greater than the outer diameter of the second terminal, and is greater than the inner diameter of the first terminal.

* * * * *